(No Model.)  4 Sheets—Sheet 4.

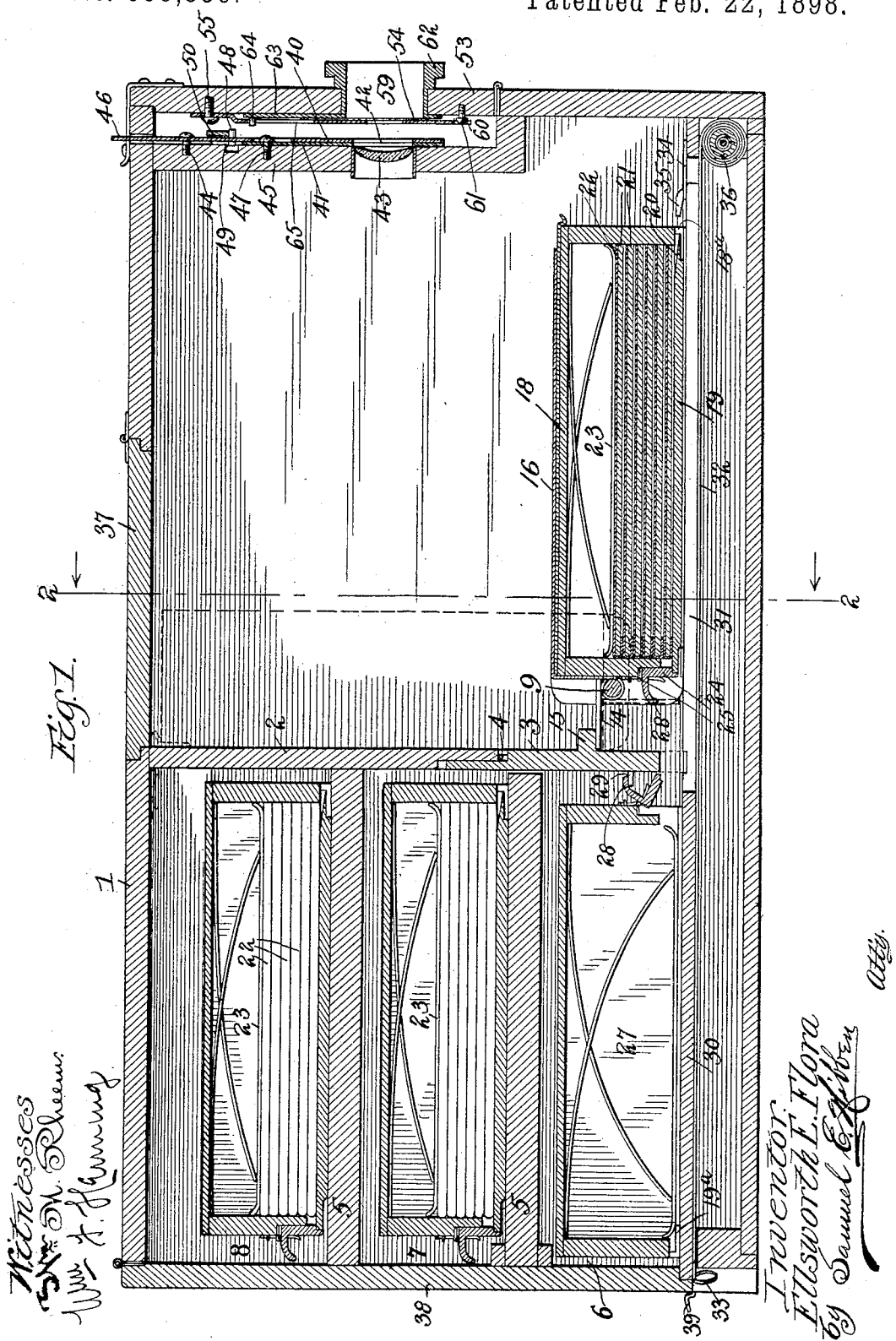

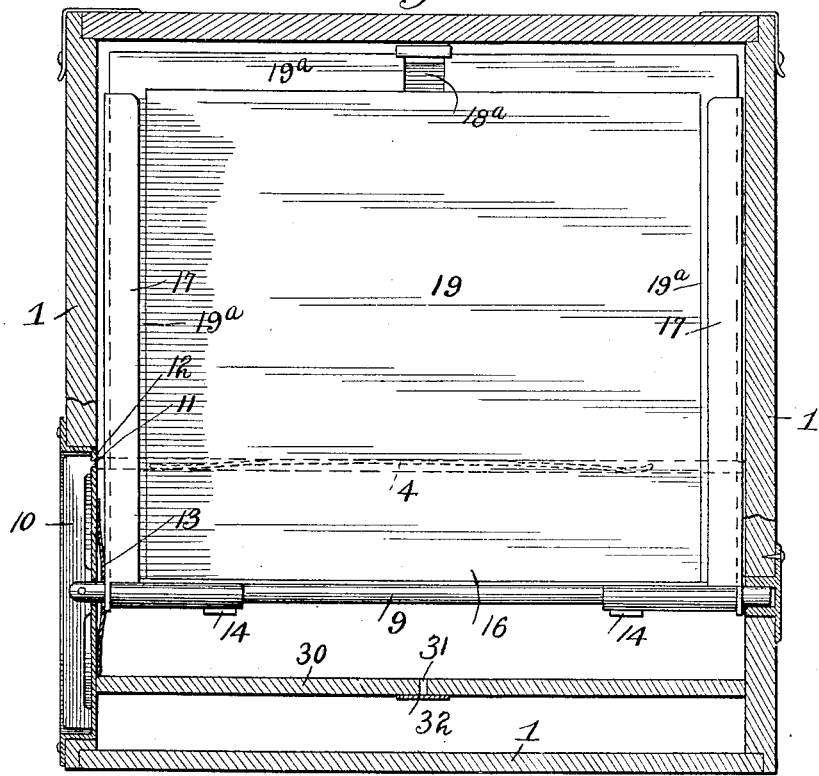

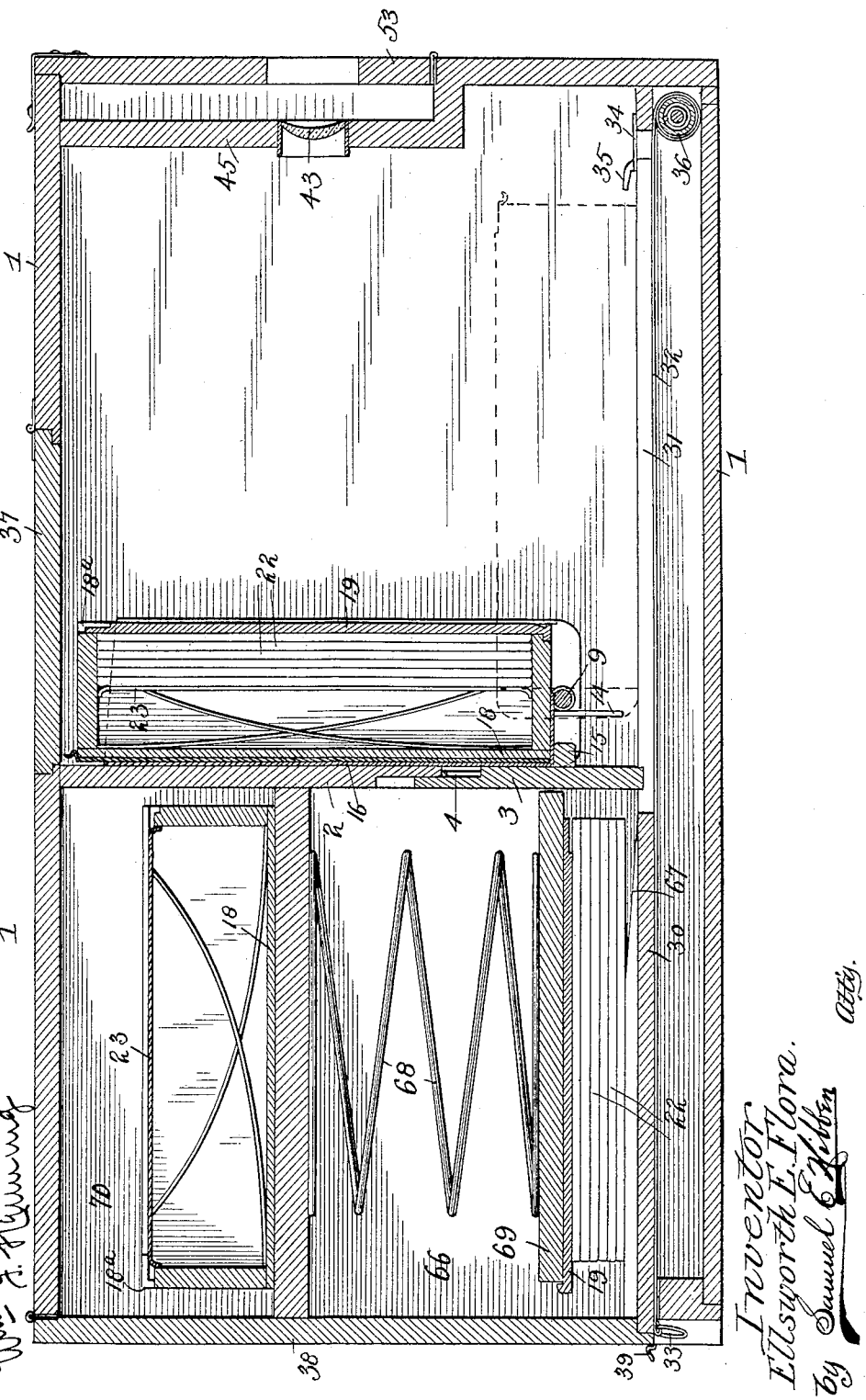

E. E. FLORA.
PHOTOGRAPHIC MAGAZINE CAMERA.

No. 599,556.  Patented Feb. 22, 1898.

Witnesses.

Inventor
Ellsworth E. Flora
by Samuel E. Hibben,
Atty.

UNITED STATES PATENT OFFICE.

ELLSWORTH E. FLORA, OF CHICAGO, ILLINOIS, ASSIGNOR OF ONE-HALF TO FRANK L. EASTMAN, OF SAME PLACE.

PHOTOGRAPHIC MAGAZINE-CAMERA.

SPECIFICATION forming part of Letters Patent No. 599,556, dated February 22, 1898.

Application filed May 13, 1897. Serial No. 636,412. (No model.)

*To all whom it may concern:*

Be it known that I, ELLSWORTH E. FLORA, residing at Chicago, Cook county, Illinois, have invented certain new and useful Improvements in Photographic Cameras, of which the following is a specification.

My invention has special relation to cameras of the magazine type; and its main objects are to provide simple and reliable means for exposing the plates, removing them from the magazine after exposure, and collecting them into an empty magazine or compartment of the camera-box without the aid of a dark room. These magazines are designed to be interchangeable and are light-tight when inserted in the camera-box, wherein the whole operation of opening the magazine and transferring the plates to an empty magazine or compartment takes place. New loaded magazines are inserted when necessary, and the magazines of exposed plates are removed without the need of a dark room, so that the process may be proceeded with continuously and indefinitely.

My invention also embodies other novel and advantageous features in cameras, especially those cameras of the magazine type, as will be apparent from the description hereinafter given.

Figure 7:
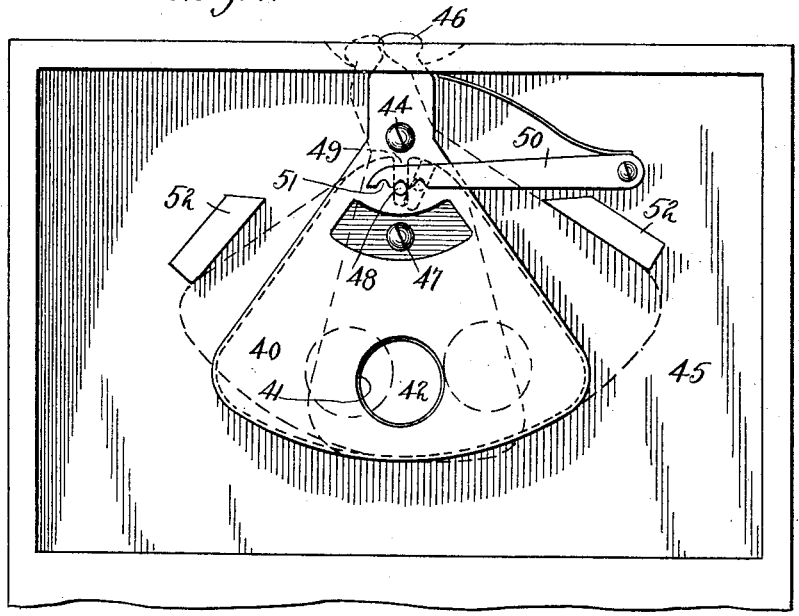

In the drawings, Figure 1 is a longitudinal section taken through my camera, showing the magazine in its position after exposure and ready for withdrawal of lid or plates, the normal position of the magazine being shown in dotted lines; Fig. 2, a section on line 2 of Fig. 1; Fig. 3, a top view of the magazine-holder; Fig. 4, an edge view of the magazine; Fig. 5, a detail view showing the operation of transferring the exposed plate into an empty or unfilled magazine; Fig. 6, a longitudinal section of a modified form; Fig. 7, an elevation of a shutter, and Fig. 8 a view of the diaphragm.

My camera-box 1 is preferably rectangular and may be of any suitable or desired size and proportions. Its interior is provided with a transverse partition formed in two sections partially overlapping and comprising a stationary strip 2 and a strip 3, movable or slidable vertically upon the stationary strip, but normally forced to the bottom of the box by a spring 4, so as to divide the interior into a front compartment or exposing-chamber and rear compartment for receiving exposed plates or a supply of plates. The rear compartment is preferably subdivided by horizontal partitions 5 5 into three small compartments 6, 7, and 8, the latter two for containing loaded magazines and the former for the receiving-magazines.

A cross pin or shaft 9 extends transversely of the box in front of the partition and bears in the sides of the box. One end of the shaft extends extraneous of the box and is provided with an operating device or key 10 for the purpose of rocking the shaft and its magazine-holder when desired. This key operates, preferably, in a recess in the side of the box, so as to be substantially flush with its surface, and is provided with a locking device for holding the magazine in an up or down position or any position. This lock comprises a small pin 11 upon the key, which fits into recesses 12 upon the box as the key is turned, the pin being withdrawn from the recesses to permit rocking by drawing the key and shaft outward against the tension of a spring 13, which normally forces the shaft to the right, Fig. 2.

One or more projecting arms 14 are mounted upon the cross-shaft, and in the downward rocking of the magazine-holder they are adapted to contact a strip or projection 15 upon the lower partition 3, so as to automatically and simultaneously raise the same and provide communication from the front compartment into the smaller compartment 6, as shown in Fig. 1.

The magazine-holder 16 is rigidly attached to the shaft and is rocked thereby, the whole constituting a swinging frame. It is made of any suitable material, preferably sheet metal, and is preferably rectangular in shape, but having an open front, except for the turned-over edges 17, for retaining the magazine, as shown in Fig. 2.

The magazine 18 comprises a rectangular light-tight box having a lid 19, sliding in guides formed by the projecting front edges 19ᵃ of the box, the edges of the lid being recessed in order that its face may be flush with the front of the magazine. The front inner face of the lid is beveled at 20 to form an incline for a purpose hereinafter apparent. The magazine is adapted to hold the plates 21, each of which is contained in a plate-holder 22, formed of opaque material, preferably sheet metal, forming a solid back, with the edges of three sides thereof turned over to hold the plate. Each plate is inserted in its respective holder, and the plates and holders are then inserted into the magazine. In order to force the plates outward and to present the plates successively in proper position and in the focal plane, I provide a spring-pressed followerplate 23, pressing against the pile of plates.

One end of the magazine is provided with a door 24, extending across the magazine and hinged thereto by a cloth hinge or otherwise by hinges 25. A suitable spring 26 is adapted to normally hold the door closed except when a plate is being withdrawn.

In my preferred form, as shown in Fig. 1, I insert in the compartment 6 an empty magazine 27, which acts as a receiver for exposed plates withdrawn from the magazine in the forward compartment. All the magazines used are similar and interchangeable, and when the magazine 18 becomes empty it is placed in the compartment 6 to be filled automatically with exposed plates. In order to open the door in the magazine, each one of them has a projection or arm 28, which is engaged by a pin or projection 29 on the sliding partition 3, so that when said partition is raised by the rocking of the shaft the door of the receiving-magazine is opened automatically and simultaneously.

The camera-box has a false bottom 30, with a longitudinal slot 31, in which operates the withdrawing device, comprising, preferably, a metallic strip or a tape 32, with a right-angled end or finger piece 33. The forward end of the strip carries a sliding block 34, traveling in the slot and having a projecting lip 35, which is distant above the bottom 30 the combined thickness of a plate and that of the front edge of the magazine. In order to hold the sliding block in its normal retracted position, the strip is wound around a springroller 36. The large forward compartment has a suitable door 37 at the top to permit entrance thereto for the insertion of a loaded magazine into the holder or to receive an empty magazine. Likewise the rear compartments have preferably a single door 38, held fastened by a catch 39.

Figure 8:
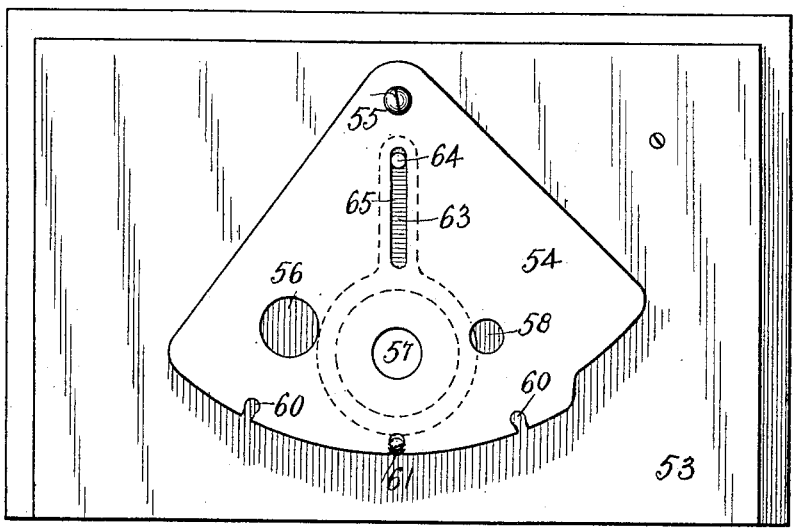

The shutter that may be used is clearly shown in Figs. 7 and 8, in which oppositelymovable disks or plates 40 and 41 are provided with similar apertures 42, which permit the passage of light to and through the lens 43 as they pass each other in their opposite movement. The plate 40 is pivoted at 44 to the wall or support 45, which carries the lens, and has an operating projection 46, extending through a slot in the top of the camerabox sufficiently to allow of its movement by the finger. The plate 41 is movable upon a pivot 47, to accommodate which a slot is cut in the plate 40. The latter plate carries a pin 48, working in a vertical slot 49 in the top of the plate 41, whereby as the plate 40 is moved in one direction the plate 41 is moved in the opposite direction. A spring-pressed finger 50 is pivoted at one end to the support 45 and its other end is provided with notches 51, engaging the pin 48. When the pin is in the middle notch, the apertures 42 register, but are closed when the pin is in either of the other notches. For other than time exposures the plates 40 and 42 are operated so that the pin will move from one of the outer notches to the other, the speed being regulated by the finger of the operator. Stops 52 are provided to limit the movement of the plates.

The front end of the camera-box preferably has a door 53, which carries on its inner side the diaphragm or stop devices, comprising a substantially segmental plate 54, pivoted to the door at 55 and having different-sized stopopenings 56, 57, and 58, adapted to be carried to the center of an opening 59 as the plate is shifted. In order to determine and retain each stop in exactly the center of the opening 59 and in axial alinement with the lens, the curved edge of the plate has recesses 60, engaging a round-headed pin 61, one recess being provided for each stop and located on the same radius.

The opening 59 has a cylinder or barrel 62, which is rotatable therein and provided with an upwardly-extending finger 63, having a pin 64, traveling in a slot in the diaphragmplate. It is obvious that when the barrel is moved in the one direction or the other the diaphragm will be shifted to present the desired size of stop, the engagement of the pin 61 with the recess of the desired stop determining whether the stop is in axial alinement with the lens.

My camera is operated as follows: The sensitive plates are put into their respective holders and a magazine is loaded therewith, after which the slide or lid is inserted. This work of loading the magazines is the only work done in the dark room, as all the operations hereinafter set forth are performed entirely within the camera-box. The magazine is thereupon placed in the magazine-holder. An empty magazine, without a lid or slide, is inserted in the compartment 6, while the compartments 7 and 8 may be utilized to hold loaded magazines containing either sensitive or exposed plates. The first operation to prepare the camera for immediate use is to remove the lid 19, which is accomplished by drawing the key 10 out slightly to disengage the locking-pins, whereupon the key may be turned to rock the magazine down to the position shown in full lines in Fig. 1. At this time the partition 3 has been raised by contact of finger 14 with projection 15. Simultaneously, through engagement of projection 29 with hook 28, the door 24 of the empty magazine has been opened, whereby a passage-way has been opened from the front compartment into the rear compartment 6 and into its contained magazine. The strip 32 is now drawn backward and the slide 34 engages the lid of the box, the edges of the box being cut away at 18ª to permit of such engagement, and removes it therefrom, forcing it backward into the empty magazine to form the lid therefor. The loaded magazine is returned to an upright position and the first plate is now ready for exposure. This plate having been exposed, the magazine is rocked to the position shown in Fig. 1 and the withdrawing device is operated as before. The plate contacts the incline 20 of the lid in the receiving-magazine and is thereby raised and forced in place.

In Fig. 5 I have shown in detail the removal of the third exposed plate, which is illustrated as striking the incline and about to raise the two plates already in the receiver prior to taking its position therebelow. As shown also in this figure, the door of the magazine 18 is forced open by the plate itself in the act of removal. It will be observed that each plate in the magazine as it takes its position in front thereof in the focal plane rests upon the projecting edges 19ª of the magazine, so that when withdrawn it occupies the same plane as the incline of the lid in the receiver, whereby it can be forced into the receiver. After exposure the magazine 18 is raised, at which time the next succeeding plate is ready for exposure, and the foregoing operation is repeated until the plates in this magazine are exhausted, whereupon the empty magazine is removed from the holder or swinging frame and substituted for the receiving-magazine now filled, and a loaded magazine is inserted in the holder 16. All the magazines are interchangeable and light-tight, and all the operations of loading the camera with magazines and removing the exposed plates which have been transferred into such magazines may be performed without the necessity of taking the camera into a dark room.

I prefer to employ the method of receiving the exposed plates as shown in Fig. 1, because in this construction the receiver may be removed without the aid of a dark room, so that the process is indefinite and continuous so long as loaded magazines are supplied; but in the modification shown in Fig. 6 I have illustrated the method of receiving the exposed plates directly into the large compartment 66. In this construction the magazines are unprovided with doors, and after the lid, with its incline, is removed and forced into the compartment 66 the plates can be withdrawn in the same manner, the lid and plates being properly raised by an incline 67 in the rear compartment.

The plates are forced into the receiving-compartment against the tension of a suitable spring 68, bearing against a block or follower 69.

A compartment 70 may or may not be provided in which to place a loaded magazine. It will be obvious from the foregoing that the compartment 66 forms a receiver for the exposed plates in the same manner as the empty magazine in the compartment 6 of the preferred form, and consequently when I use the term "receiver" in this case I mean to include both forms.

It will be understood that any other suitable exposing device, shutter, and diaphragm may be used in connection with the magazine features of my invention.

Although I have described more or less precise forms and details of construction for the sake of clearness in description, I do not intend to be understood as limiting myself thereto, as I contemplate changes in form, proportion of parts, and the substitution of equivalents as circumstances may suggest or render expedient and without departing from the spirit of my invention.

I claim—

1. In a magazine-camera, the combination with a camera-box, of a light-tight magazine therein adapted to hold plates and having a single lid, said magazine being adapted to swing from its position in the focal plane to another position during the plate-transferring operation, a plate-receiver, a door located between the magazine and receiver and providing a passage for the exposed plates to the receiver in the transferring operation, means for automatically opening the door by the swinging of the magazine from its focal plane and means for transferring the lid and plates to the receiver.

2. In a magazine-camera, a magazine comprising a light-tight box or receptacle adapted to hold plates and having grooves or slides near its top, a single lid sliding therein and adapted to be withdrawn after the insertion of the magazine in the camera, a second and similar magazine but unprovided with a lid and means for transferring the lid from the first magazine to the second magazine to form the lid for the latter and make it light-tight, such means also transferring the plates from one magazine to the other and inserting them therein between the lid and bottom of the magazine.

3. In a magazine-camera, the combination of a magazine consisting of a light-tight box adapted to hold plates, a single lid sliding therein and beveled on one side on its inner face, an exposed-plate receiver, and a transferring device for transferring the lid from the magazine into the receiver and for transferring the plates successively therein, the beveled inner face of the lid acting as an incline whereby the plates are fed into the receiver from the bottom but always above the lid.

4. In a magazine-camera, the combination of a magazine consisting of a light-tight box adapted to hold plates, a single lid sliding therein and beveled on one side on its inner face, a second and similar magazine but unprovided with a lid, means for transferring the lid from the first to the second magazine to form the lid for the latter and make it light-tight and also for transferring the plates into the second magazine above the lid whose beveled face acts as an incline for the plates.

5. In a magazine-camera, the combination of a magazine consisting of a light-tight box adapted to hold plates, and provided with a hinged door at one end, a single lid sliding in such magazine, a second and similar magazine but unprovided with a lid, means for transferring the lid and also the plates from the first magazine to the second and means for simultaneously opening the door in each magazine when it is desired to transfer the lid or a plate.

6. In a magazine-camera, the combination of a magazine consisting of a light-tight box adapted to hold plates and provided with a hinged door at one end, a single lid sliding in such magazine, a swinging frame supporting the magazine, a second and similar magazine but unprovided with a lid, means for transferring the lid and also the plates from the first magazine to the second and a connection between the swinging frame and doors of each magazine whereby as the frame is swung the doors are opened simultaneously to permit transfer of a plate.

7. In a magazine-camera, the combination of a magazine consisting of a light-tight box adapted to hold plates and provided with a normally-closed door at one end, a single lid sliding in such magazine and beveled along its forward inner edge, a second and similar magazine but unprovided with a lid, means for transferring the lid and the plates from the first to the second magazine, the lid being slid into the second magazine to form the lid thereof and make it light-tight and the plates being then successively forced up the beveled end of the lid as an incline and into the second magazine and above the lid and means for simultaneously opening the doors of the magazine when it is desired to transfer a plate.

8. In a magazine-camera, the combination of a camera-box, a light-tight magazine having a single lid, a frame located within the box and adapted to swing therein, such frame supporting and carrying the magazine, a second or receiving magazine, unprovided with a lid, means for swinging said frame and means for opening the first magazine by removing the lid while in the box and transferring it to the second magazine to form the lid thereof and for transferring the exposed plates therein between the lid so transferred and the bottom of the receiving-magazine.

9. In a magazine-camera, the combination of a camera-box having a plate-exposing compartment and a plate-receiving compartment, the compartments being normally non-communicating, a magazine pivoted in the exposing-compartment, means for swinging the magazine face down upon the bottom of the box, means for withdrawing the exposed plates from the magazine into the plate-receiving compartment and means operated by the pivoted magazine, for automatically opening communication between the compartments.

10. In a magazine-camera, the combination of a camera-box, two magazines therein, the first magazine being provided with a lid to make it light-tight and adapted to hold sensitive plates and the second or receiving magazine being open and unprovided with a lid before the camera is operated and means for transferring the lid of the first magazine at the first operation to form the lid of the second magazine to make it light-tight and also for transferring the plates from the first magazine into the second magazine while in the camera-box and inserting them therein between the lid and bottom of such second magazine.

11. In a magazine-camera, the combination of a camera-box, two interchangeable and removable magazines therein, the first or sensitive-plate-holding magazine having a single lid making it light-tight before the camera is operated and the second or plate-receiving magazine being open and unprovided with a lid before the camera is operated, and means for transferring the lid from the first magazine at the first operation to form the lid of the second magazine to make it light-tight and removable in daylight at any time, said means likewise transferring the plates from the first magazine to the second magazine and inserting them therein between the lid previously transferred and the bottom of the second magazine.

12. The combination of a camera-box, an interchangeable light-tight magazine therein for holding photographic plates for exposure and provided with a lid or closure, a similar but empty and open interchangeable magazine in the box, a swinging frame for supporting the first magazine and swinging it face down upon the bottom of the box, and means for transferring the lid and plates from the first magazine to the other, the plates being inserted between the lid and bottom of the box, whereby there is formed a light-tight magazine loaded with exposed plates and capable of removal into the light at any time regardless of the number of plates transferred to it.

13. In a magazine-camera the combination of a camera-box having a front compartment or exposing-chamber and a rear compartment, a closed removable magazine in the exposing-chamber for holding sensitive plates and provided with a removable lid or closure, a second or receiving magazine similar to the first-named magazine but unprovided with a lid and located in the rear compartment and means for first removing the lid and inserting it in the receiving-magazine to form the lid thereof to normally make it light-tight and then transferring the plates after exposure successively from the first magazine into the second or receiving magazine and inserting them therein between the lid and bottom of the magazine.

14. In a magazine-camera, the combination of a camera-box, a partition therein dividing the box-chamber into a front or exposing compartment and a rear or receiving compartment, such compartments being normally non-communicating, a removable magazine in the front compartment, a lid or closure therefor, means for swinging the magazine from normal position to plate-withdrawing position, a removable receiving-magazine in the rear compartment, means for first removing the lid and sliding it into the receiving-magazine as its lid to close the same and make it light-tight and then withdrawing the plates, after exposure, successively from the first magazine into the receiving-magazine and means operated by the swinging magazine for causing an opening through the partition when desired in the act of withdrawing the lid or plates.

15. In a magazine-camera, the combination of a camera-box, a partition therein dividing the box into a front compartment and a rear compartment, the partition being adapted to be raised to afford communication between the compartments, a plate-magazine located in the front compartment and adapted to present the plates for exposure and also adapted to swing downward with the front upon the bottom of the compartment, and to automatically operate the partition to open said communication, and a withdrawing device for withdrawing the plates from the magazine in the rear compartment and feeding the plates therein from the bottom.

16. In a magazine-camera the combination of a camera-box having front and rear compartments, a swinging frame in the front compartment adapted to swing therein from a vertical to a horizontal position substantially upon the bottom of the compartment, an interchangeable light-tight magazine having a removable lid and supported in the swinging frame, means operated in the swinging of the frame to open communication between the compartments, and a withdrawable slide engaging and withdrawing first the lid to open the magazine preparatory to exposing and removing it into the rear compartment and afterward likewise removing the plates as exposed, into the rear compartment.

17. In a magazine-camera, the combination of a camera-box, having a partition dividing the same into front and rear separate compartments, such partition being in sections and partially overlapping, one sliding upon the other to form an opening from one compartment to the other, a swinging frame in the front compartment, a magazine upon such frame, an arm connected to the frame for engaging and raising the lower section of partition when the frame is swung, and a withdrawing device for withdrawing the plates from the magazine through the opening between the compartments into the rear compartment.

18. In a magazine-camera, the combination of a camera-box having a front and rear compartment, a swinging frame in the front compartment adapted to swing from the focal plane downward into a substantially horizontal position upon the bottom of the box, a removable magazine for holding plates and carried by the swinging frame, a removable lid therefor, a spring-pressed door upon the lower side of the magazine, a similar magazine in the rear compartment but empty and unprovided with a lid, a sliding projection substantially at the bottom of the box and engaging the lid when the frame is in a downward position and removing the same from the magazine in the front compartment against the tension of its door and into the empty magazine to form the lid therefor, such projection also adapted to successively engage the plates and remove them in a similar manner and force them into the empty magazine, and means for opening the door of the empty magazine to permit of the entrance of the lid and plates.

19. In a magazine-camera, the combination of a camera-box, a loaded magazine adapted to swing therein from an upright to a face-downward position, means extraneous of the box for swinging the magazine and locking it in different positions, an exposed-plate receiver, a partition in the box separating the magazine from the plate-receiver, means for raising the partition during the transferring operation, and a slide engaging the plates and removing them successively from the loaded magazine into the receiver.

20. In a magazine-camera, the combination of a camera-box having a partition formed of sections 2 and 3 partially overlapping and slidable upon each other, such partition normally dividing the box into a front and rear compartment, means for holding the sections in normal position to so divide the box and prevent intercommunication, a cross-shaft in the front compartment and bearings in the sides of the box, a swinging frame mounted on the shaft, a magazine carried by the frame and adapted to contain plates, an arm 14 on the shaft, a projection 15 on the partition-section 3 and engaged by the arm 14, a key extraneous of the box for swinging the frame, and a withdrawing device engaging the plates successively and withdrawing them into the rear compartment.

21. In a magazine-camera, the combination of a camera-box having a front and rear compartment, a swinging frame in the front compartment adapted to swing downward from a vertical to a horizontal position, a magazine carried by the frame, a false bottom for the box having a central longitudinal slot therein, a strip extending beneath the false bottom from near the front to the back of the camera-box and extending outside the box, a block or projection upon the strip and protruding through the slot into the camera-box interior to engage the plates in the magazine when the same is swung downward upon the false bottom and to remove the plates by sliding them successively into the rear compartment and a spring device for normally holding the strip and its block in normal or retracted position.

22. In a magazine-camera, the combination of a camera-box having a partition dividing the same into a front or exposing compartment and a rear or receiving compartment, a magazine in the exposing-compartment provided with a lid and adapted to hold sensitive plates, a second or receiving magazine in the other compartment similar to the first magazine but unprovided with a lid, means for transferring the lid from the first to the second magazine to form the lid for the latter and make it light-tight and also for transferring the plates successively into the second magazine, and means for opening communication through the partition during the transferring operation, the partition normally separating the compartments in a light-tight manner and the receiving-magazine being at all times light-tight and removable regardless of the number of plates contained except during the transferring operation.

23. In a magazine-camera, the combination of a camera-box having an exposing and a receiving compartment, an exposing-magazine located in the exposing-compartment and provided with a lid to make it light-tight before the camera is operated, a similar magazine for receiving exposed plates but unprovided with a lid, said receiving-magazine being located in the receiving-compartment of the camera-box and removable at all times, and means for transferring the lid from the exposing-magazine to the receiving-magazine at the first operation to make the latter magazine light-tight, said transferring means also transferring the exposed plates and inserting them into the receiving-magazine between its lid and bottom.

24. The combination of a camera-box having a movable partition provided on one side with a projection 15 and on the other side with a projection 29, the partition dividing the box into front and rear compartments, a swinging frame pivoted in the front compartment, a supply-magazine and a receiving-magazine, the former arranged in the frame and the latter in the rear compartment, each magazine comprising a box or receptacle having a spring-pressed door normally closed but opening to permit withdrawal or insertion of plates, an arm 28 upon the door, an arm 14 connected to the swinging frame and contacting the projection 15 to raise the partition when the frame is swung, the door of the receiving-magazine being simultaneously opened by contact of arm 28 and projection 29, and means for engaging and withdrawing the plates successively from the supply-magazine into the other magazine.

25. A photographic-lens diaphragm comprising a pivoted segmental plate having stop-openings of different diameters and having a slot, a cylinder or barrel, a finger connected thereto and a pin or stud located upon the finger and entering the slot whereby as the barrel is turned the plate is shifted.

26. A photographic shutter comprising a plate 40 having a pivot 44 and a light-aperture 42, an arm 46 for operating this plate, a second plate 41 having a pivot 47 and a radial slot 49, a pin 48 located on the plate 40 and traveling in slot 49 and a spring-pressed arm 50 having notches 51 engaging pin 48.

27. In a photographic camera the combination with a camera-box and its lens, of a segmental plate 54 having a pivot 55 and stop-openings, and also having a slot 65, a barrel 62 in front of the plate and provided with a finger 63, a pin 64 arranged upon the finger and traveling in the slot, the plate 54 having notches 60 on radial lines with the pivot and centers of the stop-openings and a pin 61 with which the notches loosely engage to determine the correct alinement of the centers of the lens and stop-openings.

ELLSWORTH E. FLORA.

Witnesses:
J. N. HANSON,
SAMUEL E. HIBBEN.